Feb. 27, 1973  L. M. SHELDON  3,718,884

GROUNDED FLANGED WIRING DEVICE

Filed June 24, 1971

*Inventor*
*Luther M. Sheldon*

By *Paul E. Rockford*
Attorney

United States Patent Office 3,718,884
Patented Feb. 27, 1973

3,718,884
GROUNDED FLANGED WIRING DEVICE
Luther M. Sheldon, Cranston, R.I., assignor to
General Electric Company
Filed June 24, 1971, Ser. No. 156,180
Int. Cl. H01r 3/06
U.S. Cl. 339—14 R                    1 Claim

ABSTRACT OF THE DISCLOSURE

A grounded flanged wiring device is provided in which the grounding is achieved with reliability and economy by incorporating a grounding strap into the grounding line of the connector and using the structural support member to effect a grounding connection to a metal flange and from this flange to the housing of an instrumentality to be grounded.

---

The present invention relates to wiring devices used in connection with machinery for supply of electric power either to or from the machinery. More particularly it relates to the supply of such electric power with devices which minimize risk of personal injury or property damage by providing electrical grounding continuity to the machinery housing with great reliability and at low cost.

Devices employed in distribution and supply of electric power from a primary source to a stationary or movable apparatus require an electrical cable and connectors for each end of the cable.

Such connectors are described in U.S. Pat. 3,461,417, assigned to the same assignee as this application. Where the supply of power is to a machine or apparatus within a housing or enclosure the connector is conveniently mounted directly to the housing. Where such connection is made concern develops over the safety of use of the apparatus. This concern is with personal injury to persons who may receive electric shock from touching the housing if due to a malfunction of the apparatus a live electrical part comes in contact with the metal housing.

To overcome such hazards various schemes are employed to ground the metal enclosure. A most effective way to achieve such grounding is by electrically connecting the housing to the grounding lead of the power supply.

Where temporary connections are involved this is desirably done through the connector itself.

It is accordingly an object of the present invention to provide a connector which permits rapid reliable low cost grounding connection of metal housings of apparatus and the like.

It is another object of the present invention to provide a device in which connection of the device into an apparatus results in grounding of the metal housing of the apparatus.

Other objects will be in part apparent and in part pointed out in the description which follows.

In one of its broader aspects the objects of the invention may be achieved by providing a device comprising a metal plate having an outer planar section and a central aperture,
a generally cylindrical wiring device one end of which is mounted to the aperture of said plate,
a metal sheet extending through the metal plate and the insulating body wall portion of the device and anchoring the metal plate to the body,
a grounding strap anchored to the other end of said housing by the other end of said strut,
said strap extending to the grounding terminal of said device whereby attachment of a grounding line to said terminal provides effective grounding of said metal flange plate.

Figure 1:
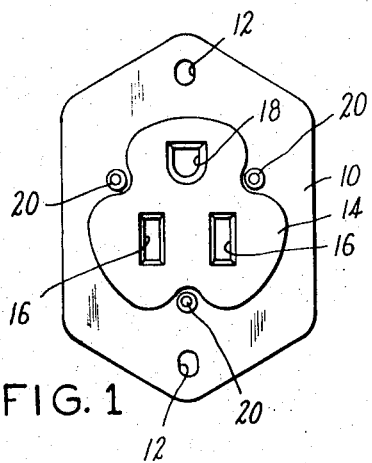
Figure 2:
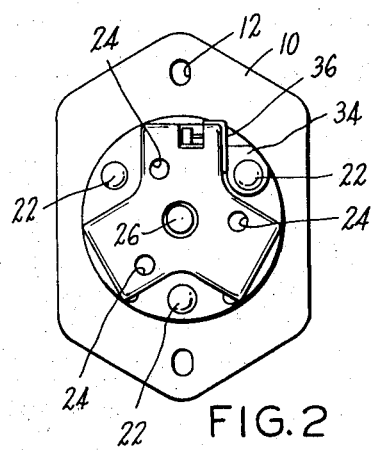
Figure 3:
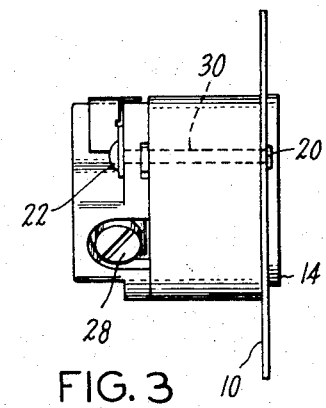
Figure 4:
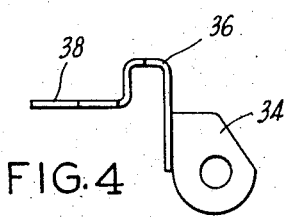
Figure 5:
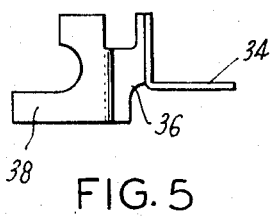
Figure 6:
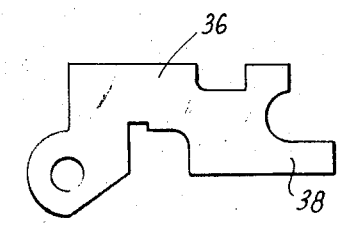
Figure 8:
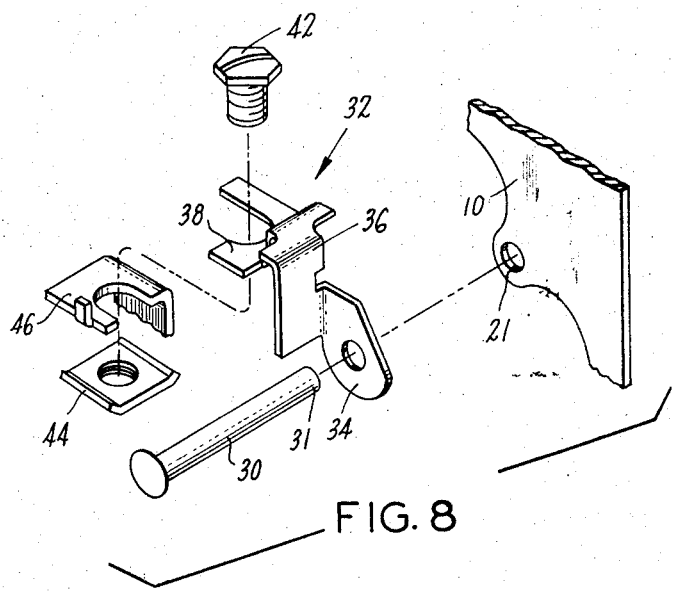
Figure 7:
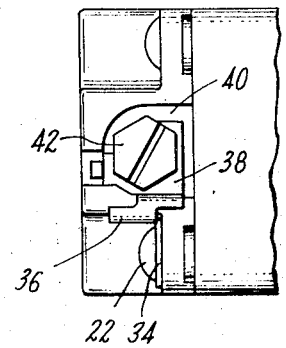

The invention and the preferred manner in which it may be carried into effect will be made clear by reference to the accompanying drawing in which:

FIG. 1 is a top plan view of a device as provided pursuant to the present invention.
FIG. 2 is a bottom plan view of the device of FIG. 1.
FIG. 3 is a side elevation of the device of FIG. 1 showing the location of a strut member in phantom.
FIG. 4 is a view of a grounding strap as seen in FIG. 2.
FIG. 5 is a view of the strap of FIG. 4 turned 90°.
FIG. 6 is a view of the blank from which the straps of FIGS. 4 and 5 were formed.
FIG. 7 is a detail view of the grounding post of a connector as illustrated in FIG. 3 but rotated 90°.
FIG. 8 is an exploded view showing the elements by which the flange is automatically included in the grounding circuit of the connector.

Referring first to FIG. 1 a metal flange 10 is shown in a generally hexagon form. Two rivet or screw holes 12 are provided at opposite corners of the hexagon for fastening the plate to an apparatus housing. An insulating housing 14 of a single receptacle is set in a clover leaf opening in the metal plate to project a conforming portion 14 of its insulating casing through the clover leaf opening as seen best in the profile view of FIG. 3.

The housing 14 has conventional blade openings of locking or non-locking configuration conventional in the electrical connector field. Two parallel blade openings 16 and a grounding port 18 are illustrated.

Rivet heads 20 are seen at the inner folds of the clover leaf formation and are at the ends of metal support struts mounted through the plastic casing of the device and through the metal plate 10. By secure mechanical contact of the rivet head to plate 10 good electrical contact of the plate to the strut is ensured.

FIG. 2 shows the connector of FIG. 1 from its reverse end and the opposite rivet heads 22 are evident in the same triangular pattern seen in FIG. 1.

The inverted Y form of the connector accommodates one blade contact in each branch of the Y. One wire entry port 24 in each branch admit power supply wire for clamping to the blade contacts within the housing. Externally accessive screw means such as 28 of FIG. 3 serve to close the clamp not shown.

A center drive screw 26 which does not extend all the way through the housing helps to hold the housing parts together.

A strut 30 as seen in phantom in FIG. 3 extends between the rivet head 20 at the front face of the device and the rivet head 22 at the shoulder of the insulating casing at the rear face of the device.

The manner in which cooperation between the strut 30 the flange plate 10, a grounding strap 32 and a grounding terminal is achieved is explained now with particular reference to FIGS. 4 through 8.

As is evident from FIG. 8, which is an exploded view of the metal elements which are in electrical contact, the plate 10 is provided with hole 21 to receive the end of strut 30 so that the strut can be locked in place by deforming its end 31 into a rivet head such as 22 at the opposite end thereof.

Because the head 31 is formed under compression a tight fit of the strut between the outer or front surface of flange 10 and a rear or outer surface of tab 34 of grounding strap 32 is achieved in assembly of the device. Good electrical contact between flange 10 and strap 32 is thereby ensured.

Strap 32 has a U-shaped center portion 36 which extends around an insulating edge of the outer portion of the grounding arm of the inverted Y as shown in FIG. 2.

A screw terminal end section 38 of strap 32 fits into the screw recess 40 surrounding grounding screw 42. The screw acts on clamp 44 to bring it forward into engagement with a wire inserted through hole 24 (see FIG. 2) and to compress the wire between clamp 44 and the anvil end 46 of a blade contact.

At the same time the screw contact end 38 of strap 32 is forced against anvil 46 thus ensuring good electrical contact between strap 32 pressed against one surface of anvil 46 and a wire element compressed against the opposite face of anvil 46.

The form of the novel strap of this invention is illustrated more clearly in FIGS. 4 and 5 where it is shown free of the parts with which it cooperates in the grounding flanged device of this invention. The strap has two attachment ends 34 and 38 set in planes at right angles and has a generally U-shaped mid-section 36 shown in inverted orientation in FIG. 4. The stamping from which such a part is formed is illustrated in FIG. 6.

Grounding of any metal housing or casing of an instrumentality to which the flanged connector or cap of this invention is secured is accordingly insured.

What is claimed is:

1. A grounded flanged connector which comprises
   a metal plate having an outer planar section and a central aperture,
   a generally cylindrical wiring device having insulating body wall portions, one end of said device being mounted in the aperture of said plate,
   the cylindrical axis of said device extending generally normal to the plane of said plate,
   a metal strut extending through the metal plate and an insulating body wall portion of said device and anchoring the metal plate to the body,
   a grounding strap anchored at the end of said cylindrical wiring devices opposite the metal plate by the end of said strut furthest from the metal plate,
   said strap extending to the grounding terminal of said device whereby attachment of a grounding line to said terminal provides effective grounding of said metal flange plate.

References Cited

UNITED STATES PATENTS

| 1,927,245 | 9/1933 | Russell | 339—133 R X |
| 1,768,422 | 6/1930 | Russell et al. | 339—132 R X |
| 2,686,297 | 8/1954 | Hutt | 339—14 R |
| 3,369,211 | 2/1968 | Sundquist | 339—14 R |
| 2,682,646 | 6/1954 | Hubbell | 174—51 X |

FOREIGN PATENTS

| 606,222 | 10/1960 | Canada | 174—51 |

MARVIN A. CHAMPION, Primary Examiner

R. A. HAFER, Assistant Examiner

U.S. Cl. X.R.

339—132 R, 192 R; 174—51